(12) United States Patent
Greeson

(10) Patent No.: US 6,565,620 B1
(45) Date of Patent: May 20, 2003

(54) INTERNALLY SOURCED ENGINE AIR INTAKE FILTRATION ARRANGEMENT

(75) Inventor: Christopher Van Greeson, Lincolnton, NC (US)

(73) Assignee: Dana Corporation, Toledo, OH (US)

( * ) Notice: Subject to any disclaimer, the term of this patent is extended or adjusted under 35 U.S.C. 154(b) by 14 days.

(21) Appl. No.: 09/722,051

(22) Filed: Nov. 27, 2000

(51) Int. Cl.[7] .................................................. B01D 46/10
(52) U.S. Cl. ........................ 55/385.3; 55/482; 55/485; 55/DIG. 28; 123/198 E; 180/68.1; 180/68.3; 180/68.4; 454/108; 454/147
(58) Field of Search ............................... 55/385.3, 482, 55/485, DIG. 28; 123/198 E; 180/68.1, 68.3, 68.4; 454/108, 147

(56) References Cited

U.S. PATENT DOCUMENTS

| | | | |
|---|---|---|---|
| 1,190,777 A | | 7/1916 | La Porte |
| 1,581,365 A | | 4/1926 | Thavenet |
| 1,622,498 A | | 3/1927 | Dunn |
| 2,614,654 A | * | 10/1952 | Strinden ..................... 55/385.3 |
| 2,853,153 A | | 9/1958 | Sexton |
| 3,444,700 A | * | 5/1969 | Beyer ........................ 55/385.3 |
| 4,245,550 A | * | 1/1981 | Suzuki et al. ............... 55/385.3 |
| 4,530,817 A | | 7/1985 | Holter et al. |
| 5,042,603 A | * | 8/1991 | Olson ........................ 55/385.3 |
| 5,494,497 A | * | 2/1996 | Lee ............................. 55/385.3 |
| 5,613,991 A | * | 3/1997 | Esaki et al. ................. 55/385.3 |
| 5,618,323 A | * | 4/1997 | Shearn et al. ............... 55/385.3 |
| 5,762,665 A | * | 6/1998 | Abrahamian et al. ...... 55/385.3 |
| 5,810,896 A | * | 9/1998 | Clemens ..................... 55/385.3 |
| 6,136,057 A | * | 10/2000 | Dang et al. ................. 55/385.3 |

* cited by examiner

*Primary Examiner*—David A. Simmons
*Assistant Examiner*—Minh-Chau T. Pham
(74) *Attorney, Agent, or Firm*—Millen, White, Zelano & Branigan, P.C.

(57) ABSTRACT

An arrangement for providing combustion air as well as cabin air for a motor vehicle includes an engine air intake duct which opens through the fire wall of the motor vehicle so that cabin air is used for combustion air. Fresh cabin air is continuously introduced to the vehicle cabin through a filter arrangement disposed in the trunk of the vehicle so that atmospheric air is first drawn through the filter element in the trunk of the vehicle to provide cabin air and the cabin air is then drawn for use as combustion air through an opening in the vehicle fire wall. In an additional embodiment of the invention, there is an additional combustion air filter disposed in the cabin of the vehicle for filtering cabin air prior to using the cabin air as combustion air. With this arrangement the combustion air filter is easy to change. In both embodiments available space the engine compartment of the vehicle can be increased because the air filter has been removed from the engine compartment.

15 Claims, 2 Drawing Sheets

INTERNALLY SOURCED ENGINE AIR INTAKE FILTRATION ARRANGEMENT

FIELD OF THE INVENTION

The present invention is directed to an internally sourced air intake filtration arrangement. More particularly, the present invention is directed to an arrangement wherein the air intake of an engine, such as an internal combustion engine used with a vehicle, has an air intake which originates at a location other then a location within the compartment containing the engine.

BACKGROUND OF THE INVENTION

In almost all vehicles, the air intake for an internal combustion engine driving the vehicle is located adjacent to the engine and in most cases faces the front of the vehicle. Locating the air intake at the front of vehicle adjacent to the engine generally requires that the air filter also be located within the engine compartment. Air filters must have a substantial surface area in order to be effective and consequently are relatively large in volume. Since air filters are relatively large volumes, they consume considerable space. This is especially the case since they require a housing which necessarily consumes more space then the air filter it contains. Space is at a premium within an engine compartment because there are numerous compartments and accessories associated with a modern vehicular engine. Accordingly, if the combustion air filters used with internal combustion engine could be moved out of engine compartments, then there would be either additional space within the engine compartment or the engine compartment could be made smaller, thus providing additional design flexibility for vehicles. An additional consideration is providing access for servicing and installing engines and, in the case of front wheel drive vehicles, numerous drive train components that must be periodically inspected and serviced.

An additional consideration other then space considerations is the quality of air initially introduced for combustion. Currently, combustion air is taken from the engine compartment or generally from the front portion of the car. Consequently, it is full of dirt, grit and various other particles which must be removed by the air filter. As a result, the air filter can become prematurely clogged especially if the vehicle is driven through a dusty area. This can result in inefficient engine performance up until the time the clogged filter is changed.

There are additional concerns such as reducing overall vehicle weight, which is not necessarily reduced in large increments, but can also be reduced in small increments where various components are slightly reduced in weight resulting in a meaningful overall reduction in weight. In addition, air which has been settled down in the cabin, provides more consistent and predictable airflow into the filter. This can be of significance with respect to laminar flow through to the engine. In that air temperatures can adversely effect the combustion process and lower fuel economy, introducing relatively cool denser air from passenger cabin can result in improved fuel economy when operating the engine in a hot environment.

In view of these considerations there is a need for improvements in providing engine combustion air.

SUMMARY OF THE INVENTION

In view of the aforementioned considerations, the present invention is directed to an arrangement for providing combustion air for an engine of a vehicle having a passenger cabin and an engine compartment separated from the passenger by a wall. The arrangement comprises a combustion air intake system having a first end connected to the engine and a second end opening into the passenger cabin with an air filter disposed in the combustion air intake system for filtering air drawn from the passenger cabin in order to provide filtered combustion air for the engine.

In another aspect of the invention, the air filter is disposed within the passenger cabin and in additional aspect there is a mount for the air filter in the air intake system as well as a release associated with the air filter and the mount for releasably mounting the air filter on the mount.

In still a further aspect of the invention, there is a second air intake disposed between the passenger cabin and the environment surrounding the vehicle. A second, air filter is associated with the second air intake for filtering atmospheric air as the air enters the passenger cabin.

In still a further aspect of the invention, the second air intake is in the rear of the vehicle so that the air intake may be associated with the trunk of vehicle, if the vehicle does in fact have a trunk. In accordance with this aspect of the invention, the second air filter may be disposed within the trunk of the vehicle.

BRIEF DESCRIPTION OF THE DRAWINGS

Various features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
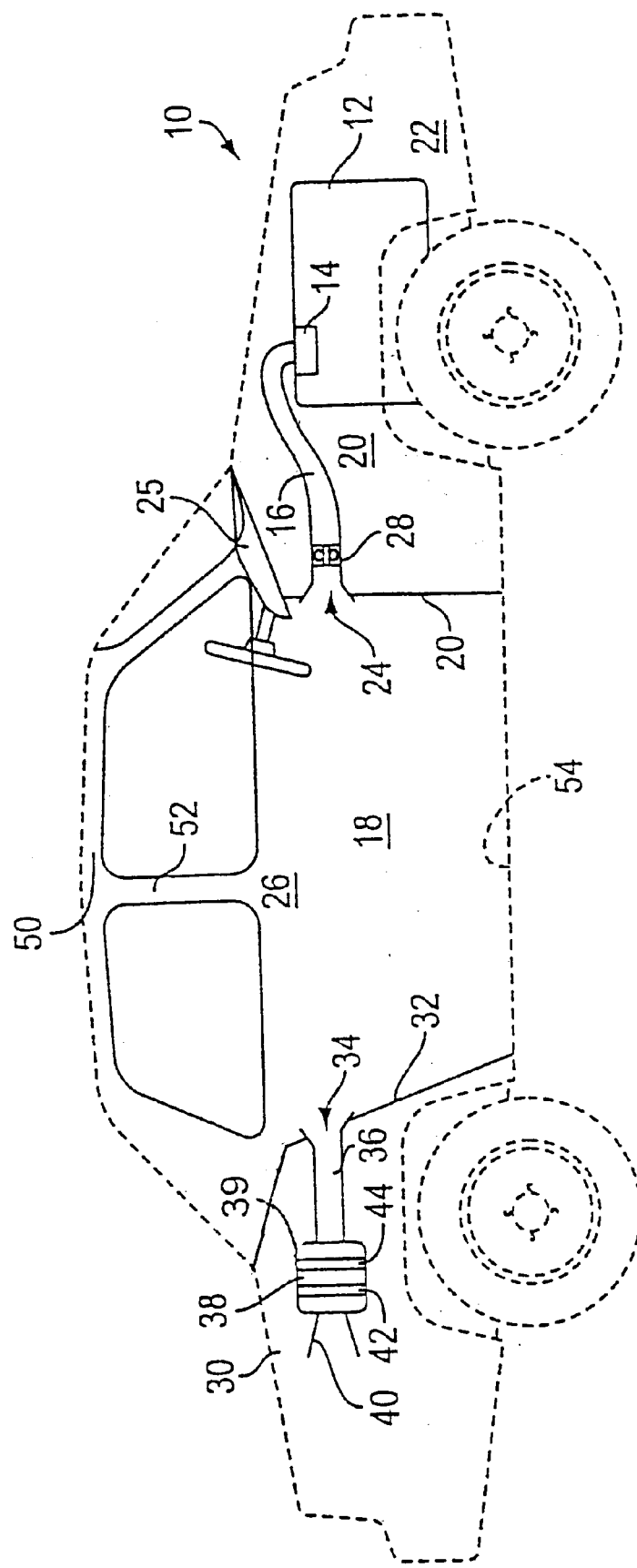
FIG. 1 is a side view illustrating an automobile with a first group of arrangements for filtering engine air and cabin air.

Referring now to FIG. 1 there is shown a motor vehicle 10 which includes an internal combustion engine 12 having a fuel injection system 14 that is connected by an air duct 16 to a cabin 18 within the vehicle. The cabin 18 is isolated by a firewall 20 from an engine compartment 22 in which the engine 12 is mounted. Air duct 16 has an opening 24 through the fire wall 20 beneath the dash 25 so that cabin air 26 within the vehicle cabin can be drawn through the opening 24 in the fire wall by the air duct 16 for delivery to the air manifold 14 of the engine 12. Optionally, an electric fan 28 is disposed in the air duct 16 in order to ensure that sufficient combustion air is available to the engine 12 by boosting the air input if necessary.

The vehicle 10 has a trunk 30, or at least a separate rear compartment, where a trunk is normally positioned. The trunk 30 is separated from the vehicle cabin 18 by a bulkhead 32 that has an opening 34 therethrough, which opening is in communication with a cabin air inlet in the form of a duct 32 that is connected to a air filter housing 38 positioned within the trunk 34 or isolated space 30. The housing 38 has an inlet 40 which is open to the surrounding environment so that air may be drawn into the filter housing 38.

Within the filter housing 38 there is a first air filter 39 having dual filter media comprising a filter media 42 which filters out particulate matter and a filter media 44 which removes odors. For example, the filter media 42 may be a paper, cellulose or polyester filter media while the filter element 44 may be an activated carbon filter media. Both the filter media 42 and filter media 44 are replaceable by opening the housing 38 and sliding the filters out.

While the air inlet 34 is shown extending through a rear bulk head 32, the opening 34 may be optionally placed in the ceiling 50 of the vehicle, or in the side frames 52, or through the floor 54 with the inlet duct 36 connecting the selected opening to the filter housing 38 in the trunk or space 30.

Cabin air 26 is drawn in through the duct 16 by a vacuum created in the inlet air manifold 14 as engine 12 draws air for combustion. The cabin air has already been cleaned by the filter 42 and is settled down within the vehicle cabin 18 before being drawn into the engine and therefore allows an increased opportunity for controlling airflow through the duct 16. Since the filters 40 and 44 are in the trunk, there is a substantial reduction in particulate matter which might enter the housing 38 as compared to the current situation in which the air intake faces forward in the engine compartment 22 and therefore directly receives particulate matter and road debris.

By having the arrangement shown in FIG. 1, the engine air filter 42 may be of many sizes and capacities based on airflow need and filter life expectancy. Both the filter media 42 and the filter media 44 are in a very accessible location for changing when required. Moreover, at least in the first embodiment, the need for one filter for cabin air and one for the combustion air is eliminated, thus, directly reducing maintenance costs and vehicle weight.

Figure 2:
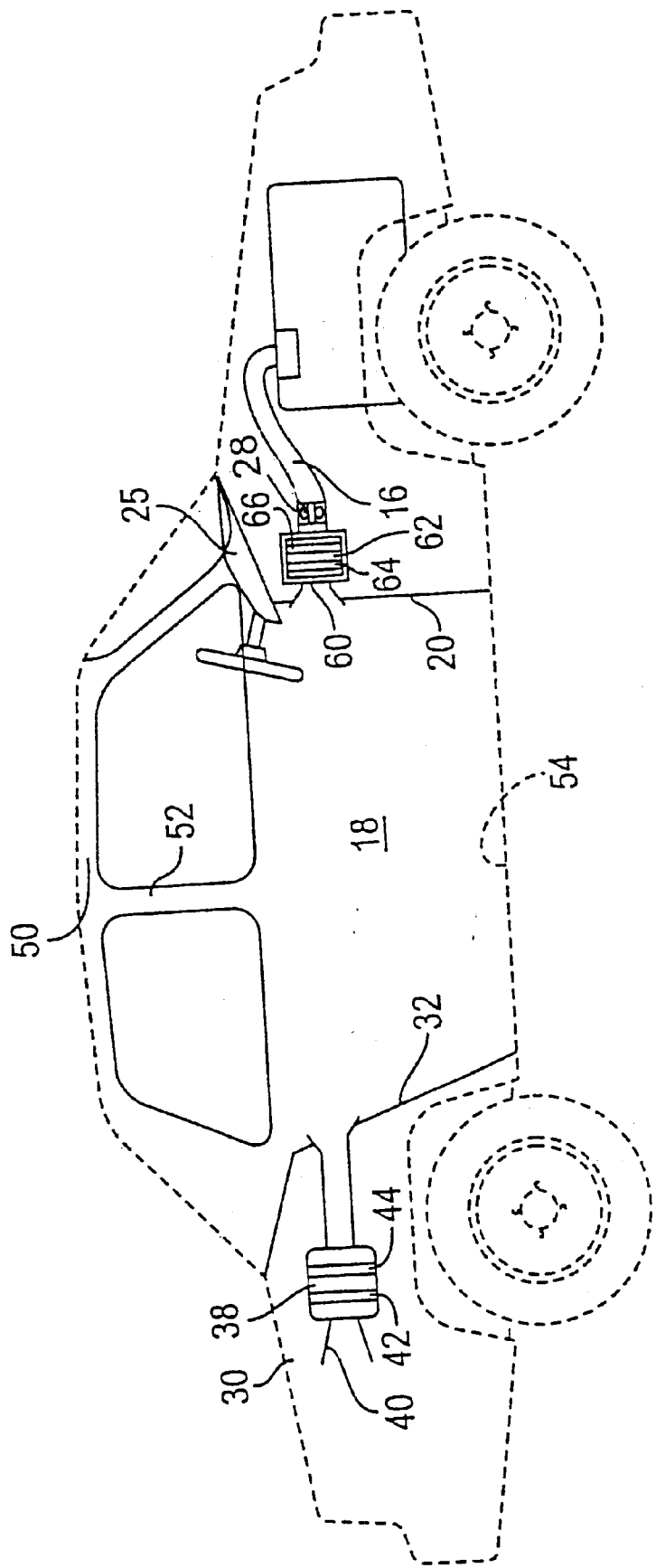
FIG. 2 is a side view similar to FIG. 1 but showing a second group of arrangements for filtering engine air and cabin air.

Referring now to FIG. 2, there is shown a second arrangement of the invention wherein the filter housing 38, first air filter 39 comprising dual filter media 42 and 44 are located within a trunk or other isolated space 30 separated from the cabin 18 by a bulkhead 32 with air introduced either through the bulk head 32, the ceiling 50, side pillars 52 or floor 54. The arrangement of FIG. 2 differs from that of FIG. 1 in that there is a second air filter 60 disposed inside of the firewall 20 in a position preferably beneath the dash 25. The filter second air 60 comprises a filter support 62 which supports at least one filter element 64, and optionally, an additional filter element 66 so that there is a dual media air filter arrangement with the filter media 64 removing fairly large dirt particles which may have entered the cabin 18 and the second filter media 66 having a finer filter capacity in order to remove very small particles from the air stream entering the air inlet duct 16. Due to the interior position of the filter support 62, the filter media of the filter element 64 and 66 is not exposed to heat or moisture and will have a useful life expectancy substantially greater then a filter within the engine compartment. While the arrangement of FIG. 1 is preferably an original equipment arrangement, the arrangement of FIG. 2 could be used as an add-on or after market use in existing vehicles.

Both the arrangement of FIG. 1 and that of FIG. 2 save space in the engine compartment 22 and allow for easier filter changes. Moreover, both arrangements extend filter life and engine life while providing for clean cabin air, reduced maintenance and possible reductions in overall vehicle weight. There is the additional advantage of reducing air inlet temperatures on warm days, which improves the combustion process and fuel economy.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An arrangement for providing combustion air for an engine of a vehicle having a passenger cabin separated from a surrounding environment containing air and an engine compartment separated from the passenger cabin by a wall, the arrangement comprising:

a combustion air intake system having a first end connected to the engine and a second end opening to the passenger cabin;

an air inlet between the passenger cabin and the exterior of the passenger cabin for letting air into the passenger cabin, and at least a first air filter between the passenger cabin and the surrounding environment disposed in a coactive relationship with the air inlet, for filtering air drawn into the passenger cabin and for providing filtered combustion air for the engine.

2. An arrangement according to claim 1 wherein the first air filter is disposed within the passenger cabin.

3. An arrangement according to claim 2 further including a second air intake disposed between the passenger cabin and the environment surrounding the vehicle and a second air filter associated with a second air intake for filtering atmospheric air as the air enters the passenger cabin.

4. An arrangement according to claim 2 wherein the first air filter is a dual air filter one of which filters out large particles and the other of which filters out smaller particles.

5. An arrangement according to claim 2 wherein the first air intake is connected to the cabin by openings in the ceiling of the cabin, the floor of the cabin or the side pillars of the cabin.

6. An arrangement according to claim 2 further including a second air filter, the second filter being in a coactive relationship with the combustion air intake for filtering previously filtered cabin air.

7. An arrangement according to claim 6 wherein there is a mount for the second air filter as well as a release asssociated with the second air filter and the mount for releasably mounting the second air filter on the mount in coactive relationship with the combustion air intake system.

8. An arrangement according to claim 6 further including a fan within the combustion air intake system for boosting air flow to the engine.

9. An arrangement according to claim 1 wherein the first air intake is in the rear of the vehicle.

10. An arrangement according to claim 9 wherein the vehicle includes a trunk at the rear of the vehicle and wherein the air inlet is in communication with the passenger compartment through the trunk.

11. An arrangement according to claim 10 wherein the first air filter is disposed within the trunk.

12. An arrangement according to claim 11 wherein the first air filter is an air filter having a duel filter media one of which filters particles and the other of which filters odors.

13. An arrangement according to claim 12 wherein the filter media which filters particles, is made of paper, cellulose or polyester yarn and the filter media which filters odors is made of activated carbon.

14. An arrangement according to claim 1 further including a fan within the combustion air intake system for boosting air flow to the engine.

15. An arrangement according to claim 14 wherein the second air filter is a dual air filter, one of which filters out large particles and the other of which filters out smaller particles.

\* \* \* \* \*

UNITED STATES PATENT AND TRADEMARK OFFICE
CERTIFICATE OF CORRECTION

PATENT NO. : 6,565,620 B1
DATED : May 20, 2003
INVENTOR(S) : Christopher Van Greeson et al.

It is certified that error appears in the above-identified patent and that said Letters Patent is hereby corrected as shown below:

Column 4,
Line 53, reads "duel," should read -- dual --
Line 56, reads "particles, is," should read -- particles is --

Signed and Sealed this

Twenty-fourth Day of August, 2004

JON W. DUDAS
*Director of the United States Patent and Trademark Office*